(12) United States Patent
Vittal et al.

(10) Patent No.: US 12,248,445 B2
(45) Date of Patent: Mar. 11, 2025

(54) METHOD AND SYSTEM FOR PROVIDING DATA QUALITY CAPABILITY WITHIN DISTRIBUTED DATA LAKES

(71) Applicant: JPMorgan Chase Bank, N.A., New York, NY (US)

(72) Inventors: Sreenivas Vittal, Bangalore (IN); Raghuram Sampathkrishna, Cypress, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 49 days.

(21) Appl. No.: 17/970,743

(22) Filed: Oct. 21, 2022

(65) Prior Publication Data

US 2024/0086380 A1 Mar. 14, 2024

(30) Foreign Application Priority Data

Sep. 8, 2022 (IN) .............................. 202211051387

(51) Int. Cl.
  *G06F 16/215* (2019.01)
  *G06F 16/25* (2019.01)
  *G06F 16/27* (2019.01)

(52) U.S. Cl.
  CPC .......... *G06F 16/215* (2019.01); *G06F 16/258* (2019.01); *G06F 16/27* (2019.01)

(58) Field of Classification Search
  CPC ....... G06F 16/215; G06F 16/27; G06F 16/258
  USPC ........................................................ 707/692
  See application file for complete search history.

(56) References Cited

U.S. PATENT DOCUMENTS

| 2014/0075028 A1* | 3/2014 | Welner ................. G06F 16/215 |
| | | 709/226 |
| 2017/0193031 A1* | 7/2017 | Papapanagiotou ......................... |
| | | H04L 63/0428 |
| 2020/0097456 A1* | 3/2020 | Tran .................... G06F 16/2423 |
| 2022/0114191 A1* | 4/2022 | Peterson ............. G06F 16/2372 |

* cited by examiner

*Primary Examiner* — Giovanna B Colan
(74) *Attorney, Agent, or Firm* — GREENBLUM & BERNSTEIN P.L.C.

(57) ABSTRACT

A method for providing an integrated data quality capability for distributed data repositories is disclosed. The method includes identifying, from a data stream, an indication that a job corresponding to a source data set has been started, the job relating to a data ingestion job and a data transformation job; triggering a data reconciliation action based on the identified indication; persisting, in a repository, a first result of the data reconciliation action; initiating a data quality action based on the first result; persisting, in the repository, a second result of the data quality action; initiating a scan action based on the second result; persisting, in the repository, a third result of the scan action; and generating a graphical element and a report based on an analysis of the first result, the second result, and the third result, the graphical element is displayable via a graphical user interface.

20 Claims, 8 Drawing Sheets

METHOD AND SYSTEM FOR PROVIDING DATA QUALITY CAPABILITY WITHIN DISTRIBUTED DATA LAKES

CROSS-REFERENCE TO RELATED APPLICATIONS

This application claims the benefit of Indian Non-Provisional Patent Application No. 202211051387, filed Sep. 8, 2022, which is hereby incorporated by reference in its entirety.

BACKGROUND

1. Field of the Disclosure

This technology generally relates to methods and systems for ensuring data quality, and more particularly to methods and systems for providing an integrated data quality capability that enables data reconciliation and data quality checks as data is ingested and transformed in distributed data repositories.

2. Background Information

Many business entities operate large data lakes as distributed data repositories that provide data sourcing and authoritative data for mission critical operations such as, for example, firmwide reporting and regulatory reporting. Often, rigorous data quality checks are required to maintain data quality in the data lakes. Historically, implementations of conventional data quality capabilities have resulted in varying degrees of success with respect to maintaining the data quality of the data lakes when data is ingested and transformed.

One drawback of using the conventional data quality capabilities is that in many instances, the data quality checks are performed in a batch manner after the data is persisted. As a result, consumption of the data without confirmation of data quality may result in invalid and/or incorrect data usage in the mission critical operations. Additionally, when the data quality checks are not performed prior to data writing and data provisioning in the data lakes, subsequently detected errors may require re-ingesting and retransforming the entire batch of persisted data.

Therefore, there is a need to provide an integrated data quality capability that enables data reconciliation and data quality checks as data is ingested and transformed in distributed data repositories.

SUMMARY

The present disclosure, through one or more of its various aspects, embodiments, and/or specific features or sub-components, provides, inter alia, various systems, servers, devices, methods, media, programs, and platforms for providing an integrated data quality capability that enables data reconciliation and data quality checks as data is ingested and transformed in distributed data repositories.

According to an aspect of the present disclosure, a method for providing an integrated data quality capability for distributed data repositories is disclosed. The method is implemented by at least one processor. The method may include identifying, from a data stream, an indication that at least one job corresponding to a source data set has been started, the at least one job may relate to at least one from among a data ingestion job and a data transformation job; triggering at least one data reconciliation action based on the identified indication; persisting, in a repository, a first result of the at least one data reconciliation action; initiating at least one data quality action based on the first result; persisting, in the repository, a second result of the at least one data quality action, the second result may include information that relates to at least one from among profile metadata and exception data; initiating at least one scan action based on the second result, the at least one scan action may identify personally identifiable information in the data stream; persisting, in the repository, a third result of the at least one scan action; and generating at least one graphical element and at least one report based on an analysis of the first result, the second result, and the third result, the at least one graphical element may be displayable via a graphical user interface.

In accordance with an exemplary embodiment, the triggering may include an automated action that relates to at least one from among an ad hoc triggering of the at least one data reconciliation action as the at least one job is performed and a scheduled triggering of the at least one data reconciliation action as the at least one job is performed.

In accordance with an exemplary embodiment, to trigger the at least one data reconciliation action, the method may further include invoking at least one profile object that is associated with the source data set, the profile object may correspond to a plurality of configuration files; and reconciling, according to the at least one profile object, the at least one job based on a comparison of the source data set with a corresponding target data set.

In accordance with an exemplary embodiment, the method may further include detecting at least one error based on an outcome of the reconciling; identifying, by using a model, at least one potential issue based on the outcome of the reconciling; determining, by using the model, at least one recommended action to correct the detected at least one error and the identified at least one potential issue; and displaying, via the graphical user interface, the determined at least one recommended action on the at least one graphical element.

In accordance with an exemplary embodiment, the at least one profile object may correspond to at least one from among a control profile and a risk profile, the at least one profile object may define a reconciliation type and a reconciliation configuration.

In accordance with an exemplary embodiment, the reconciling may be performed at a plurality of data levels, the plurality of data levels may include at least one from among a data category level, an entity level, a record level, an attribute level, and a metrics level with variance details.

In accordance with an exemplary embodiment, to reconcile the at least one job, the method may further include identifying, based on the at least one profile object, at least one record in the source data set to bypass; and automatically skipping the reconciling for the identified at least one record.

In accordance with an exemplary embodiment, to initiate the at least one data quality action, the method may further include initiating at least one data quality tool for the source data set and a corresponding target data set; and generating at least one data quality report based on an output of the at least one data quality tool.

In accordance with an exemplary embodiment, the at least one graphical element may relate to a visual representation of an outcome of the analysis, the at least one graphical element may correspond to a dashboard that includes at least one from among a heat map component, a summary component, a record counts component, a details component, an aging component, and an attribute list component.

According to an aspect of the present disclosure, a computing device configured to implement an execution of a method for providing an integrated data quality capability for distributed data repositories is disclosed. The computing device including a processor; a memory; and a communication interface coupled to each of the processor and the memory, wherein the processor may be configured to identify, from a data stream, an indication that at least one job corresponding to a source data set has been started, the at least one job may relate to at least one from among a data ingestion job and a data transformation job; trigger at least one data reconciliation action based on the identified indication; persist, in a repository, a first result of the at least one data reconciliation action; initiate at least one data quality action based on the first result; persist, in the repository, a second result of the at least one data quality action, the second result may include information that relates to at least one from among profile metadata and exception data; initiate at least one scan action based on the second result, the at least one scan action may identify personally identifiable information in the data stream; persist, in the repository, a third result of the at least one scan action; and generate at least one graphical element and at least one report based on an analysis of the first result, the second result, and the third result, the at least one graphical element may be displayable via a graphical user interface.

In accordance with an exemplary embodiment, the triggering may include an automated action that relates to at least one from among an ad hoc triggering of the at least one data reconciliation action as the at least one job is performed and a scheduled triggering of the at least one data reconciliation action as the at least one job is performed.

In accordance with an exemplary embodiment, to trigger the at least one data reconciliation action, the processor may be further configured to invoke at least one profile object that is associated with the source data set, the profile object may correspond to a plurality of configuration files; and reconcile, according to the at least one profile object, the at least one job based on a comparison of the source data set with a corresponding target data set.

In accordance with an exemplary embodiment, the processor may be further configured to detect at least one error based on an outcome of the reconciling; identify, by using a model, at least one potential issue based on the outcome of the reconciling; determine, by using the model, at least one recommended action to correct the detected at least one error and the identified at least one potential issue; and display, via the graphical user interface, the determined at least one recommended action on the at least one graphical element.

In accordance with an exemplary embodiment, the at least one profile object may correspond to at least one from among a control profile and a risk profile, the at least one profile object may define a reconciliation type and a reconciliation configuration.

In accordance with an exemplary embodiment, the processor may be further configured to perform the reconciling at a plurality of data levels, the plurality of data levels may include at least one from among a data category level, an entity level, a record level, an attribute level, and a metrics level with variance details.

In accordance with an exemplary embodiment, to reconcile the at least one job, the processor may be further configured to identify, based on the at least one profile object, at least one record in the source data set to bypass; and automatically skip the reconciling for the identified at least one record.

In accordance with an exemplary embodiment, to initiate the at least one data quality action, the processor may be further configured to initiate at least one data quality tool for the source data set and a corresponding target data set; and generate at least one data quality report based on an output of the at least one data quality tool.

In accordance with an exemplary embodiment, the at least one graphical element may relate to a visual representation of an outcome of the analysis, the at least one graphical element may correspond to a dashboard that includes at least one from among a heat map component, a summary component, a record counts component, a details component, an aging component, and an attribute list component.

According to an aspect of the present disclosure, a non-transitory computer readable storage medium storing instructions for providing an integrated data quality capability for distributed data repositories is disclosed. The storage medium including executable code which, when executed by a processor, may cause the processor to identify, from a data stream, an indication that at least one job corresponding to a source data set has been started, the at least one job may relate to at least one from among a data ingestion job and a data transformation job; trigger at least one data reconciliation action based on the identified indication; persist, in a repository, a first result of the at least one data reconciliation action; initiate at least one data quality action based on the first result; persist, in the repository, a second result of the at least one data quality action, the second result may include information that relates to at least one from among profile metadata and exception data; initiate at least one scan action based on the second result, the at least one scan action may identify personally identifiable information in the data stream; persisting, in the repository, a third result of the at least one scan action; and generate at least one graphical element and at least one report based on an analysis of the first result, the second result, and the third result, the at least one graphical element may be displayable via a graphical user interface.

In accordance with an exemplary embodiment, the triggering may include an automated action that relates to at least one from among an ad hoc triggering of the at least one data reconciliation action as the at least one job is performed and a scheduled triggering of the at least one data reconciliation action as the at least one job is performed.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
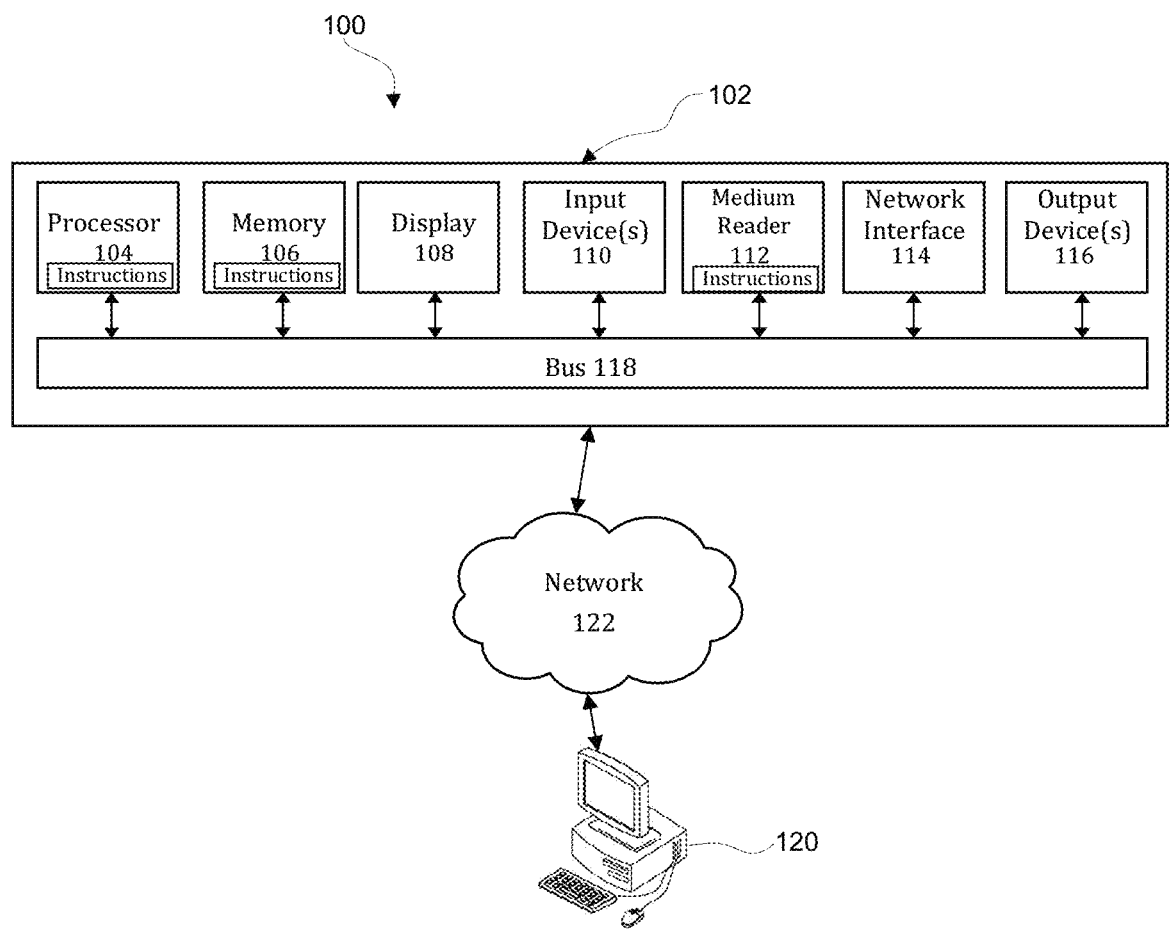
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an integrated data quality capability that enables data reconciliation and data quality checks as data is ingested and transformed in distributed data repositories.

Figure 2:
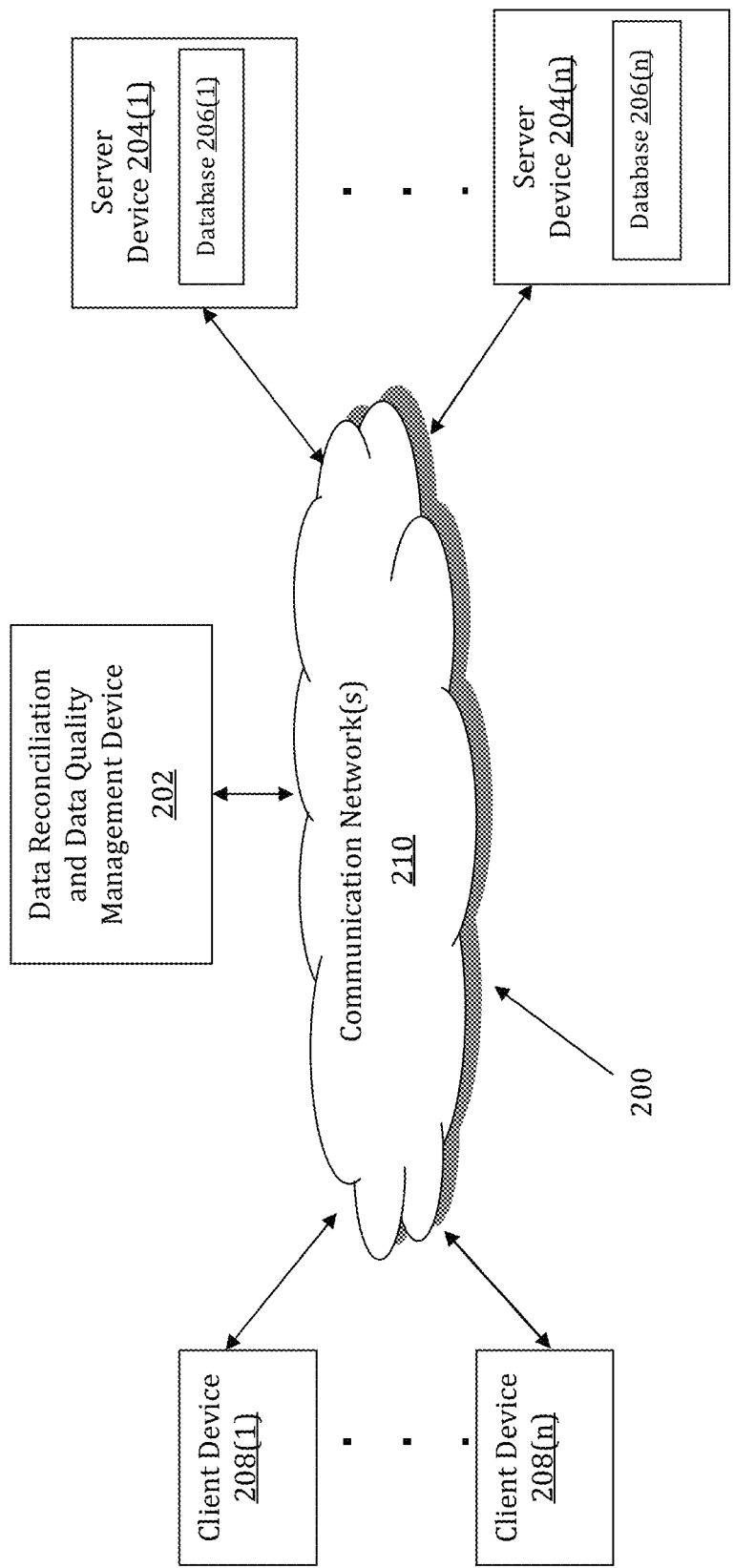
FIG. 2 illustrates an exemplary diagram of a network environment.

Referring to FIG. 2, a schematic of an exemplary network environment 200 for implementing a method for providing an integrated data quality capability that enables data reconciliation and data quality checks as data is ingested and transformed in distributed data repositories is illustrated. In an exemplary embodiment, the method is executable on any networked computer platform, such as, for example, a personal computer (PC).

The method for providing an integrated data quality capability that enables data reconciliation and data quality checks as data is ingested and transformed in distributed data repositories may be implemented by a Data Reconciliation and Data Quality Management (DRDQM) device 202. The DRDQM device 202 may be the same or similar to the computer system 102 as described with respect to FIG. 1. The DRDQM device 202 may store one or more applications that can include executable instructions that, when executed by the DRDQM device 202, cause the DRDQM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DRDQM device 202 itself, may be located in virtual server(s) running in a cloud-based computing environment rather than being tied to one or more specific physical network computing devices. Also, the application(s) may be running in one or more virtual machines (VMs) executing on the DRDQM device 202. Additionally, in one or more embodiments of this technology, virtual machine(s) running on the DRDQM device 202 may be managed or supervised by a hypervisor.

In the network environment 200 of FIG. 2, the DRDQM device 202 is coupled to a plurality of server devices 204(1)-204(n) that hosts a plurality of databases 206(1)-206(n), and also to a plurality of client devices 208(1)-208(n) via communication network(s) 210. A communication interface of the DRDQM device 202, such as the network interface 114 of the computer system 102 of FIG. 1, operatively couples and communicates between the DRDQM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DRDQM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DRDQM devices that efficiently implement a method for providing an integrated data quality capability that enables data reconciliation and data quality checks as data is ingested and transformed in distributed data repositories.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DRDQM device 202 may be a standalone device or integrated with one or more other devices or apparatuses, such as one or more of the server devices 204(1)-204(n), for example. In one particular example, the DRDQM device 202 may include or be hosted by one of the server devices 204(1)-204(n), and other arrangements are also possible. Moreover, one or more of the devices of the DRDQM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DRDQM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data ingestion jobs, data transformation jobs, source data sets, target data sets, reconciliation actions, first results, data quality actions, second results, profile metadata, exception data, graphical elements, and reports.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DRDQM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DRDQM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DRDQM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DRDQM device 202, the server devices 204(1)-204(n), or the client devices 208(1)-208(n), for example, may be configured to operate as virtual instances on the same physical machine. In other words, one or more of the DRDQM device 202, the server devices 204(1)-204(n), or the client devices 208(1)-208(n) may operate on the same physical device rather than as separate devices communicating through communication network(s) 210. Additionally, there may be more or fewer DRDQM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
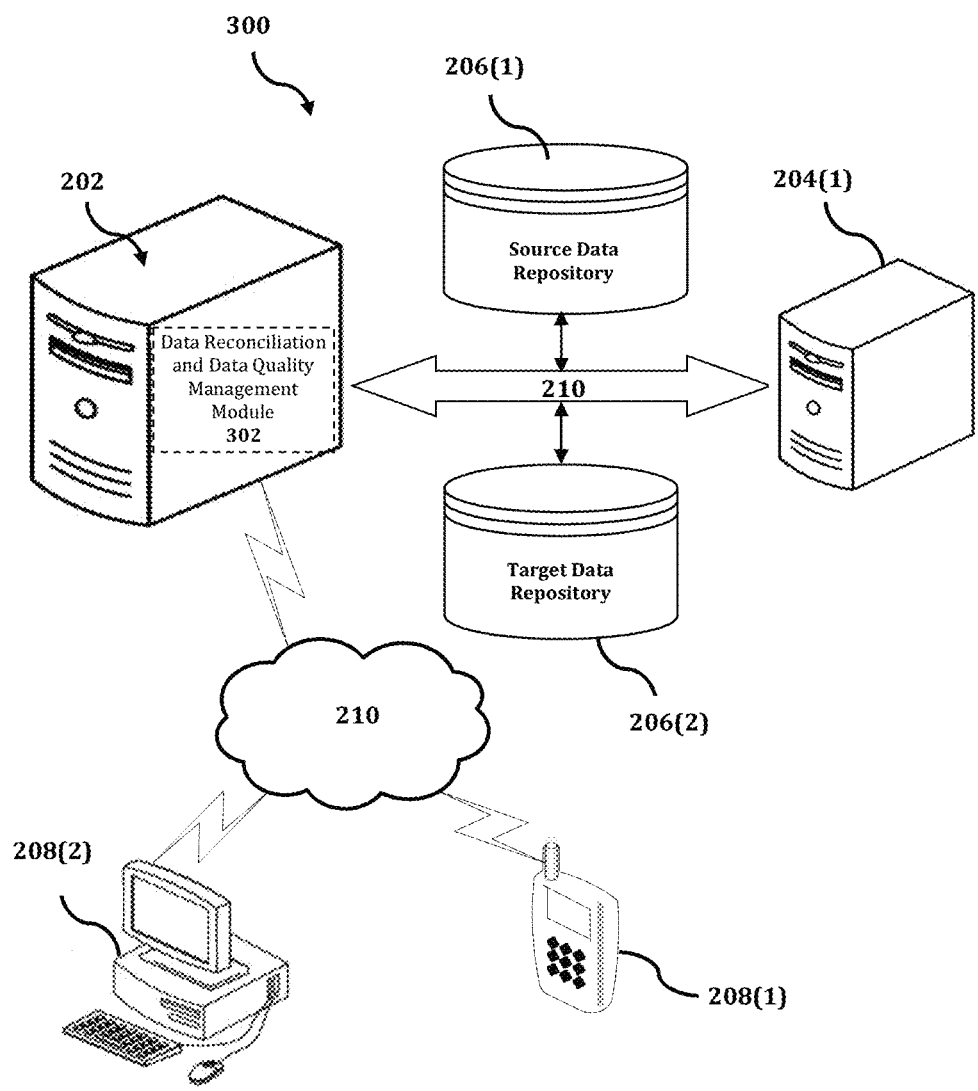
FIG. 3 shows an exemplary system for implementing a method for providing an integrated data quality capability that enables data reconciliation and data quality checks as data is ingested and transformed in distributed data repositories.

The DRDQM device 202 is described and shown in FIG. 3 as including a data reconciliation and data quality management module 302, although it may include other rules, policies, modules, databases, or applications, for example. As will be described below, the data reconciliation and data quality management module 302 is configured to implement a method for providing an integrated data quality capability that enables data reconciliation and data quality checks as data is ingested and transformed in distributed data repositories.

An exemplary process 300 for implementing a mechanism for providing an integrated data quality capability that enables data reconciliation and data quality checks as data is ingested and transformed in distributed data repositories by utilizing the network environment of FIG. 2 is shown as being executed in FIG. 3. Specifically, a first client device 208(1) and a second client device 208(2) are illustrated as being in communication with DRDQM device 202. In this regard, the first client device 208(1) and the second client device 208(2) may be "clients" of the DRDQM device 202 and are described herein as such. Nevertheless, it is to be known and understood that the first client device 208(1) and/or the second client device 208(2) need not necessarily be "clients" of the DRDQM device 202, or any entity described in association therewith herein. Any additional or alternative relationship may exist between either or both of the first client device 208(1) and the second client device 208(2) and the DRDQM device 202, or no relationship may exist.

Further, DRDQM device 202 is illustrated as being able to access a source data repository 206(1) and a target data repository 206(2). The data reconciliation and data quality management module 302 may be configured to access these databases for implementing a method for providing an integrated data quality capability that enables data reconciliation and data quality checks as data is ingested and transformed in distributed data repositories.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DRDQM device 202 via broadband or cellular communication. Of course, these embodiments are merely exemplary and are not limiting or exhaustive.

Upon being started, the data reconciliation and data quality management module 302 executes a process for providing an integrated data quality capability that enables data reconciliation and data quality checks as data is ingested and transformed in distributed data repositories. An exemplary process for providing an integrated data quality capability that enables data reconciliation and data quality checks as data is ingested and transformed in distributed data repositories is generally indicated at flowchart 400 in FIG. 4.

Figure 4:
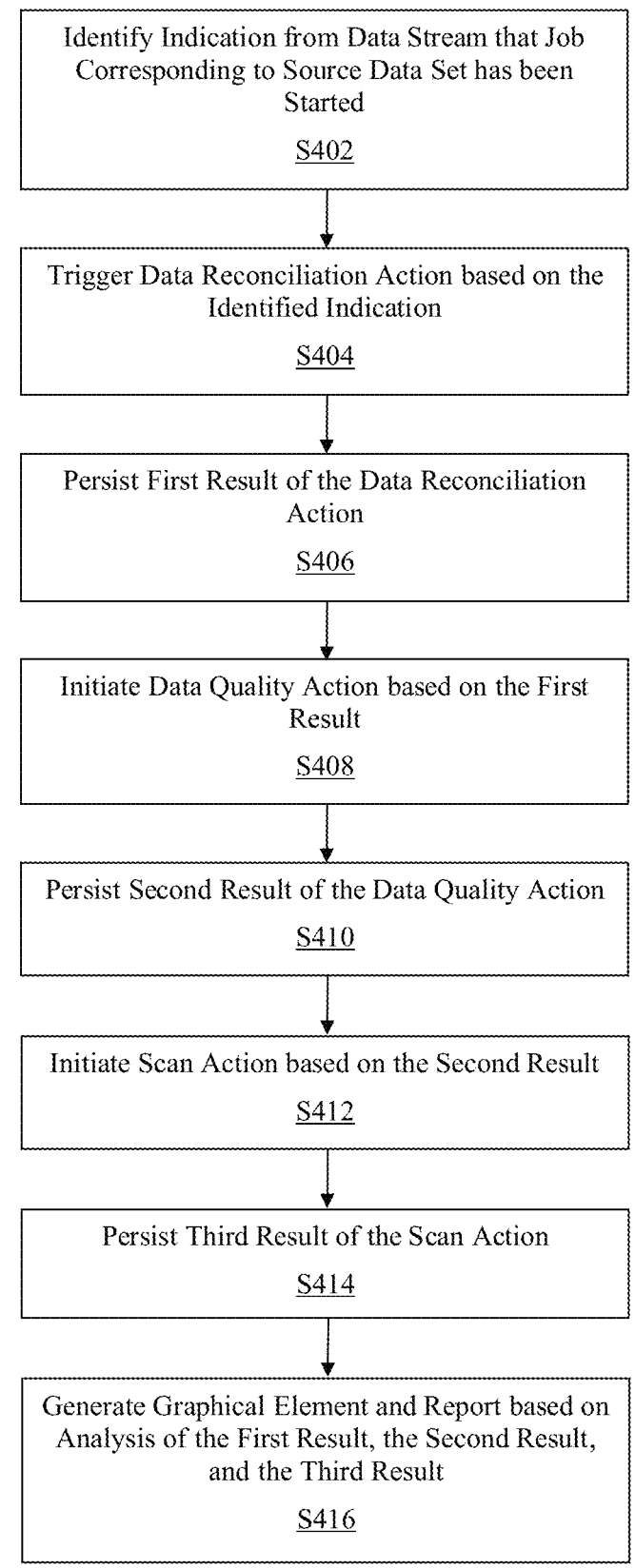
FIG. 4 is a flowchart of an exemplary process for implementing a method for providing an integrated data quality capability that enables data reconciliation and data quality checks as data is ingested and transformed in distributed data repositories.

In the process 400 of FIG. 4, at step S402, an indication that a job corresponding to a source data set has been started may be identified. The indication may be identified from a data stream. In an exemplary embodiment, the indication may be automatically detected based on identifiable data elements in the data stream. For example, the indication may correspond to metadata of a data packet that is associated with the ingestion of the source data set. In another exemplary embodiment, the indication may correspond to a trigger that is associated with the source data set. For example, a data ingestion trigger that is associated with the source data set may be triggered when ingestion of the source data set is initiated.

In another exemplary embodiment, the job may correspond to an operation or a group of operations that are treated as a single and distinct unit. The job may relate to at least one from among a data ingestion job and a data transformation job. In another exemplary embodiment, the data ingestion job may correspond to operations that obtain and import the source data set for immediate use or storage in a database. The source data set may be streamed in real-time as a source emits it or in batches of various sizes. In another exemplary embodiment, the data transformation job may correspond to operations that convert the source data set from one format to another. The data transformation job may convert a raw data source from a database such as, for example, a data lake into a cleansed, validated, and ready-to-use format.

In another exemplary embodiment, the source data set may originate from a source database that includes a hierarchical data warehouse that stores data in files and/or folders. The hierarchical data warehouse may relate to a data model that stores data in the form of records and is organized into a tree-like structure. In another exemplary embodiment, the source database may relate to a centralized repository such as, for example, a data lake that enables the storage of unstructured data in a native data format. The data lake may utilize a flat architecture and object storage to persist the unstructured data.

In another exemplary embodiment, the source database may correspond to a networked repository that includes a centralized repository such as, for example, a data lake that enables the persisting of structured and unstructured data at any scale. The data lake may persist at least one from among structured data, semi-structured data, unstructured data, and binary data. In another exemplary embodiment, the centralized repository may persist data as-is, without having to first structure the data, as well as run different types of analytics such as, for example, a dashboard analytic, a visualization analytic, a big data processing analytic, a real-time analytic, and a machine learning analytic. In another exemplary embodiment, the networked repository may include a curated repository such as, for example, a data reservoir that enables the persisting of structured data.

In another exemplary embodiment, the source database may correspond to a distributed data lake that includes a heterogeneous and distributed set of platforms. The platforms may be integrated to present a unified view of all data for users. In another exemplary embodiment, the source database may correspond to a type of data platform architecture such as, for example, a data mesh that persists data via a plurality of domains. The data mesh may relate to decentralized management of different data sources.

At step S404, data reconciliation actions may be triggered based on the identified indication. In an exemplary embodiment, the triggering may include an automated action that relates to an ad hoc triggering of the data reconciliation actions as the job is performed. The ad hoc triggering may be initiated in response to the identified indication. The ad hoc triggering may be based on a variable threshold such as, for example, an available processing bandwidth of a host system. In another exemplary embodiment, the triggering may include an automated action that relates to a scheduled triggering of the data reconciliation actions as the job is performed. The scheduled triggering may be initiated in response to the identified indication. The scheduled triggering may be based on a predetermined parameter such as, for example, after each block of ingested data.

In another exemplary embodiment, to trigger the data reconciliation actions, profile objects that are associated with the source data set may be invoked. The profile object may represent a collection of commands as well as correspond to a plurality of configuration files. In another exemplary embodiment, the configuration files may include data in any data storage format. For example, the configuration files may include JAVASCRIPT Object Notation (JSON) files, Structured Query Language (SQL) files, and Property Sheet (PROPS) files. Then, the job may be reconciled based on a comparison of the source data set with a corresponding target data set. The job may be reconciled according to the profile objects and the plurality of configuration files.

In another exemplary embodiment, the profile objects may correspond to at least one from among a control profile and a risk profile. The profiles may define a set of permissions to perform various operations outlined in the present disclosure. The operations may include querying, adding, updating, and/or deleting information. In another exemplary embodiment, the profile objects may include commands, command sets, and separators that define the content and order of actions such as, for example, the data reconciliation action. The profile object may define a reconciliation type and a reconciliation configuration for the source data set.

In another exemplary embodiment, the reconciling may be performed at a plurality of data levels. The plurality of data levels may include at least one from among a data category level, an entity level, a record level, an attribute level, and a metrics level with variance details. The reconciling may also be configured at various levels such as, for example, the entity level, a row level, and a column level. In another exemplary embodiment, the reconciling may support various types of reconciliations. The various types of reconciliations may include history reconciliations, live reconciliations, and metric reconciliations. In another exemplary embodiment, the reconciling may support confidential data as well as multi-level queries to fetch data sets. For example, the reconciling may support tree queries to fetch the source data sets and the target data sets.

In another exemplary embodiment, the reconciling may include an option to skip the reconciliation for selected data records. A user may use a parameter such as, for example, a skip recon parameter to bypass the selected data records. As will be appreciated by a person of ordinary skill in the art, automatically skipping data records that do not need reconciliation may reduce the amount of data records that must be processed and save system resources. In another exemplary embodiment, to bypass a record, the record may be identified in the source data set based on parameters in the profile object. Then, the reconciling may be automatically skipped for the identified record.

In another exemplary embodiment, errors may be detected based on an outcome of the reconciling. The errors may correspond to a mismatch between the source data set and the target data set. A potential issue may also be identified based on the outcome of the reconciling. The potential issue may correspond to a predicted issue that may arise based on a current state of data ingestion and/or data transformation. The potential issue may be identified by using a model such as, for example, a machine learning model. Then, by using the model, a recommended action may be determined to correct the detected error and the identified potential issue. The recommended action may be determined based on a guideline such as, for example, an operating guideline for efficient resource allocation and a business guideline for efficient operation. Finally, the determined recommended action may be displayed in a graphical element via a graphical user interface.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S406, a first result that corresponds to the data reconciliation actions may be persisted in a repository. In an exemplary embodiment, the first result may include information that relates to system metrics, the reconciliation actions, the source data sets, and the target data sets. The system metrics may include resource measurements that are monitored for performance, availability, and reliability. In another exemplary embodiment, the first result may include details of the reconciliation action. The details may include numbers of matching records from the source data set and the target data set, missing record details in the target data set, missing record details in the source data set, data discrepancies between the source data set and the target data set, duplicate record details in the target data set, duplicate record details in the source data set, first identified dates of any break, aging details of each of the breaks, and data lineage of each of the attributes.

In another exemplary embodiment, the first result may be persisted in a repository that is separate from the source data set and the target data set. The repository may correspond to a data warehouse that provides data query and analysis via a collection of software utilities such as, for example, APACHE HADOOP that facilitates use of a network of many computers to solve problems. In another exemplary embodiment, the repository may be integrated with analytics engines such as, for example, APACHE SPARK. The analytics engines may be implemented for large-scale data processing.

At step S408, data quality actions may be initiated based on the first result. The data quality actions may be initiated after a successful reconciliation is confirmed by using the first result. In an exemplary embodiment, to initiate the data quality action, a data quality tool may be initiated for the source data set and a correspond target data set. A data quality report may be automatically generated based on an output of the data quality tool. In another exemplary embodiment, the data quality actions may facilitate analysis of the dataset to determine potential shortcomings based on identified errors and detected issues. The potential shortcomings may relate to inaccurate data, noncompliant data, uncontrolled data, unsecured data, static data, and dormant data.

In another exemplary embodiment, the inaccurate data may contain misspellings, wrong numbers, missing information, and blank fields. The noncompliant data may not meet regulatory standards. The uncontrolled data may become polluted over time due to a lack of continuous monitoring. The unsecured data may be left vulnerable to access by unauthorized third parties. The static data may have never been updated, thus becoming obsolete. Similarly, the dormant data may not be usable due to a lack of updates and shares.

At step S410, a second result that corresponds to the data quality actions may be persisted in the repository. The second result may include information that relates to at least one from among profile metadata and exception data. In an exemplary embodiment, consistent with present disclosures, the second result may also include information that relates to system metrics, the reconciliation actions, the source data sets, and the target data sets. The system metric may include resource measurements that are monitored for performance, availability, and reliability.

In another exemplary embodiment, the second result may be persisted in a repository that is separate from the source data set and the target data set. The repository may correspond to a data warehouse that provides data query and analysis via a collection of software utilities such as, for example, APACHE HADOOP that facilitates use of a network of many computers to solve problems. In another exemplary embodiment, the repository may be integrated with analytics engines such as, for example, APACHE SPARK. The analytics engines may be implemented for large-scale data processing.

At step S412, scan actions may be initiated based on the second result. The scan actions may be initiated to identify sensitive information such as, for example, personally identifiable information in the data stream. In an exemplary embodiment, the scan actions may relate to a framework that is usable to identify personally identifiable information data in a given dataset. The framework may also be usable to generate reports that include information relating to the scanned sensitive information. In another exemplary embodiment, the framework may utilize regular expression patterns for identification. The regular expressions may relate to a sequence of characters that specifies a search pattern in textual data. The regular expression patterns may be used to match character combinations in strings.

In another exemplary embodiment, the scan actions may identify all string data type fields automatically and scan the identified data type fields. The scan actions may support predetermined rules for regular expression patterns. The predetermined rules may relate to parameters for the processing of personally identifiable information. In another exemplary embodiment, the scan actions may support delta processing of various data sets. Delta processing may include processing of target data tables with only modified or entirely new data records, which may improve system performance. The delta processing may also generate reports with corresponding information.

In another exemplary embodiment, the scan actions may provide self-service screens to users to maintain personally identifiable information rules. Consistent with present disclosures, the self-service screens may correspond to graphical user interfaces that enables the users to manage the personally identifiable information rules. In another exemplary embodiment, the scan actions may be configurable at data category levels as an independent job. Similarly, the scan actions may be configurable at entity level as an independent job. In another exemplary embodiment, the scan actions may scan various types of data such as, for example, PARQUET files, AVRO files, comma-separated values (CSV) files, and data from rest application programming interfaces (APIs).

At step S414, a third result that corresponds to the scan actions may be persisted in the repository. In an exemplary embodiment, the third results may be written as a column-oriented data file format such as, for example, a PARQUET file format that is designed for efficient data storage and retrieval. The third results may be written in a distributed file system such as, for example, a HADOOP distributed file system (HDFS) that is designed to run on commodity hardware. In another exemplary embodiment, the third results may correspond to data containers such as, for example, IMPALA tables and viewed on top of the column-oriented data files. The third results may be viewable on a graphical element such as, for example, a dashboard to show metrics and details.

At step S416, graphical elements and reports may be automatically generated based on an analysis of the first result, the second result, and the third result. The graphical elements may be displayable on a user device via a graphical user interface. In an exemplary embodiment, the analysis of the first result and the second result may be accomplished by using integrated analytics engines. The integrated analytics engines may be implemented for large-scale data processing consistent with present disclosures.

In another exemplary embodiment, the graphical elements may relate to a visual representation of an outcome of the analysis. The graphical element may correspond to a dashboard that includes at least one from among a heat map component, a summary component, a record counts component, a details component, an aging component, and an attribute list component. In another exemplary embodiment, the graphical element may include interactive elements that are configured to facilitate interaction with a user. The interactive elements may correspond to various components of the graphical element. For example, the user may interact with a heat map component on a dashboard for additional information on frequently occurring actions.

In another exemplary embodiment, the summary component may include information that relates to a number of source records, a number of target records, a number of matching records, a number of difference attributes, a number of duplicate records in the source data set, a number of duplicate records in the target data set, a number of missing records in the source data set, a number of missing records in the target data set, a threshold calculated value, a status of the reconciliation, and a reason for failure. The reason for failure may be automatically determined consistent with present disclosures.

Figure 5:
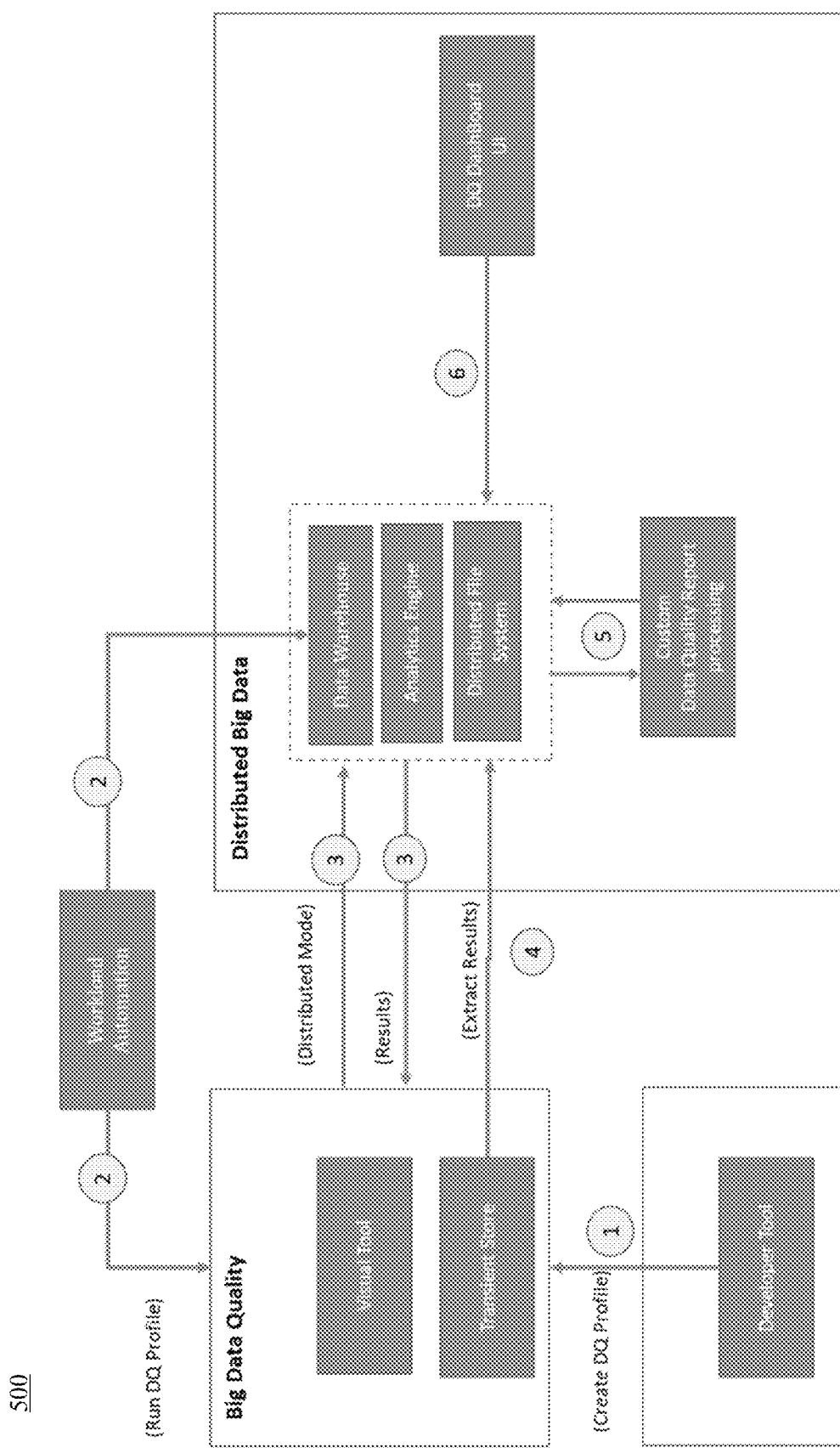
FIG. 5 is an architecture diagram of an exemplary process for implementing a method for providing an integrated data quality capability that enables data reconciliation and data quality checks as data is ingested and transformed in distributed data repositories.

FIG. 5 is an architecture diagram 500 of an exemplary process for implementing a method for providing an integrated data quality capability that enables data reconciliation and data quality checks as data is ingested and transformed in distributed data repositories. In FIG. 5, a data quality capability consistent with present disclosures may be integrated with a data storage solution such as, for example, a distributed data lake. The data quality capability may be scalable based on the data storage solution and enable plug-and-pay integration.

As illustrated in FIG. 5, the data quality capability may interact with workload automations, which interacts with developer tools to create a data quality profile as well as with transient stores and visual tools. The data quality capability may utilize separate data warehouses, analytics engines, and distributed file systems consistent with present disclosure to provide data visualization tools such as, for example, custom data quality report processing and data quality dashboard user interface processing.

In another exemplary embodiment, the data quality capability may be usable to manage schema evolutions and schema changes. Additionally, the data quality capability may facilitate parameterization of data quality profiles by providing a profiling option for a specific data set based on different selection criteria. The data quality capability may also facilitate entitlement implementations to process different data sources with high/medium confidentiality. Furthermore, parallel processing of multiple data sources may enable the data quality capability to be a scalable and flexible solution to achieve parallelism for data quality rule execution.

Figure 6:
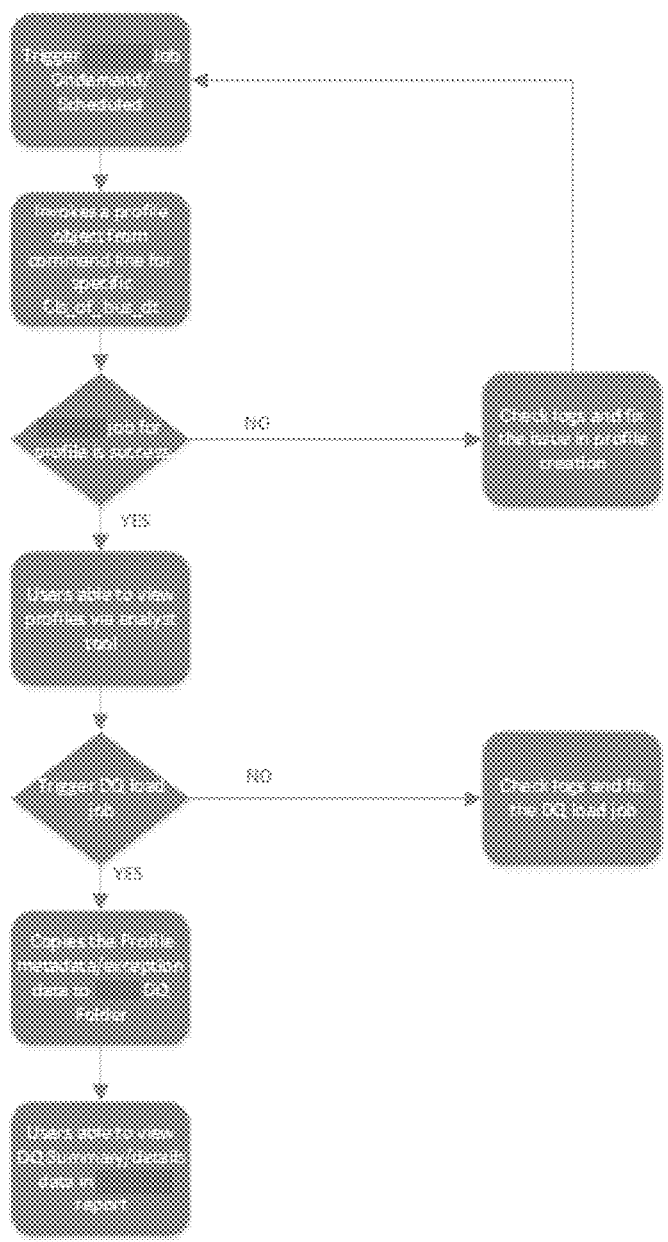
FIG. 6 is a data quality flow diagram of an exemplary process for implementing a method for providing an integrated data quality capability that enables data reconciliation and data quality checks as data is ingested and transformed in distributed data repositories.

FIG. 6 is a data quality flow diagram 600 of an exemplary process for implementing a method for providing an integrated data quality capability that enables data reconciliation and data quality checks as data is ingested and transformed in distributed data repositories. In FIG. 6, an exemplary data flow through the data quality capability is presented consistent with present disclosures.

Figure 7:
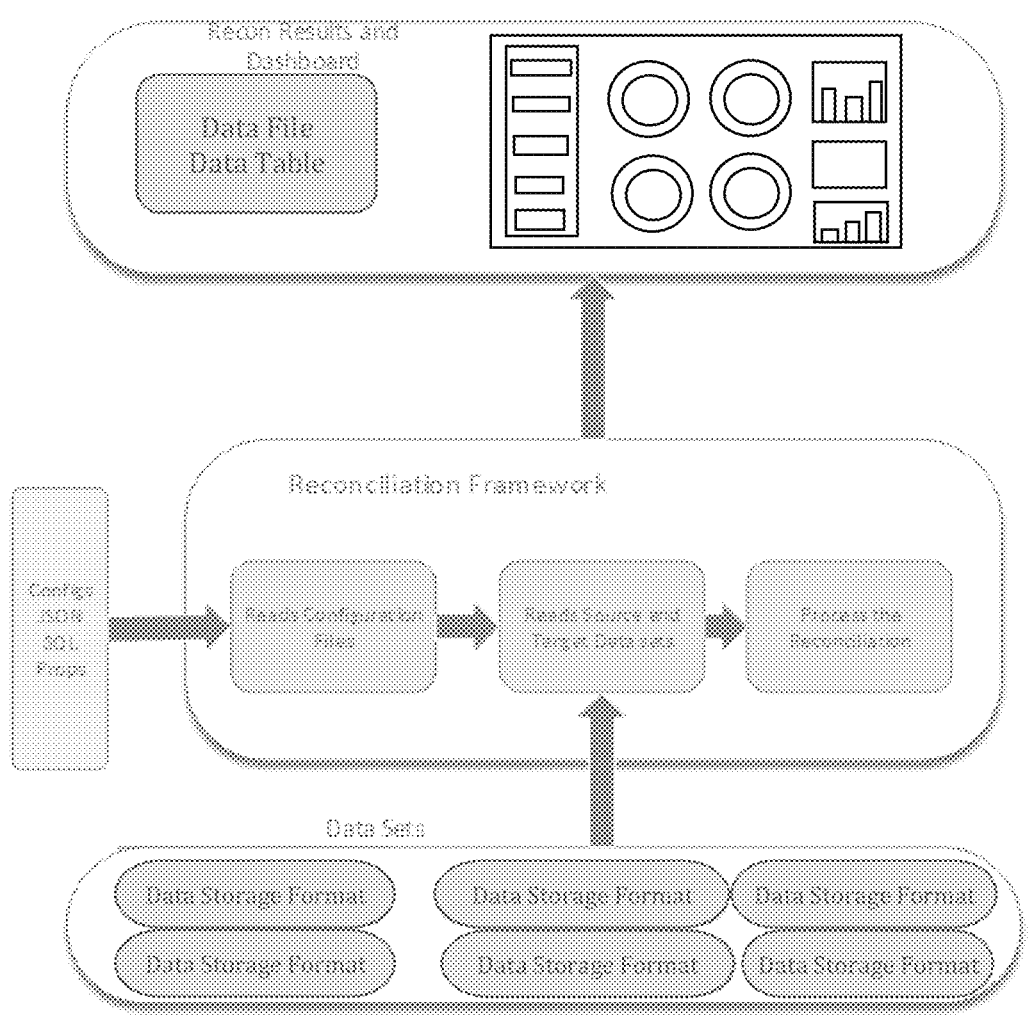
FIG. 7 is a reconciliation flow diagram of an exemplary process for implementing a method for providing an integrated data quality capability that enables data reconciliation and data quality checks as data is ingested and transformed in distributed data repositories.

FIG. 7 is a reconciliation flow diagram 700 of an exemplary process for implementing a method for providing an integrated data quality capability that enables data reconciliation and data quality checks as data is ingested and transformed in distributed data repositories. In FIG. 7, an exemplary reconciliation process is presented consistent with present disclosures.

As illustrated in FIG. 7, the reconciliation framework may access and read configuration files. The reconciliation framework may also access various data repositories containing data in various data storage formats to read source data sets and target data sets. Then, consistent with present disclosures, the reconciliation framework may process the reconciliation. Based on a result of the processing, the reconciliation results may be presented on a graphical element such as, for example, a dashboard via a graphical user interface.

Figure 8:
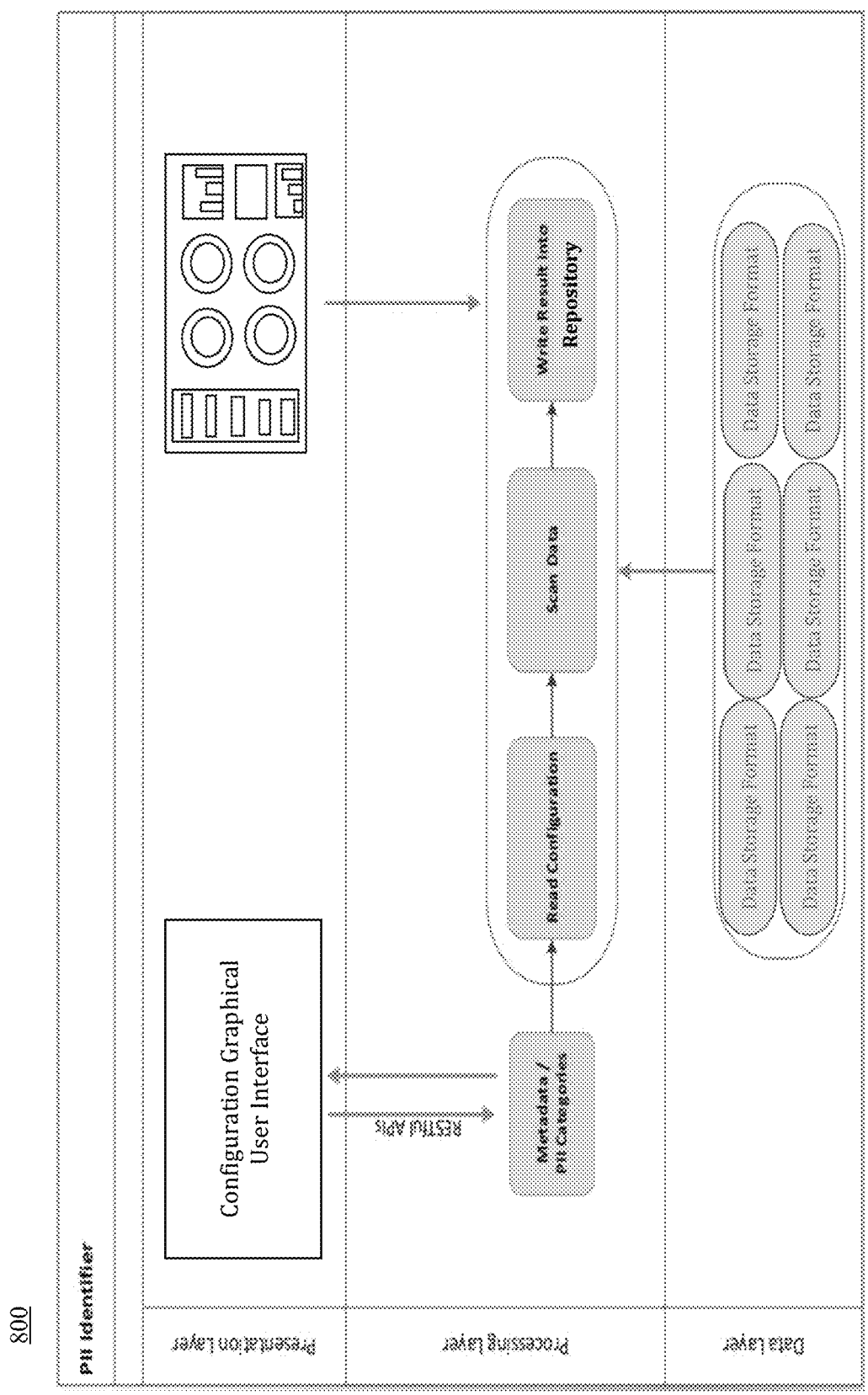
FIG. 8 is a flow diagram of an exemplary sensitive information identification process for implementing a method for providing an integrated data quality capability that enables data reconciliation and data quality checks as data is ingested and transformed in distributed data repositories.

FIG. 8 is a flow diagram 800 of an exemplary sensitive information identification process for implementing a method for providing an integrated data quality capability that enables data reconciliation and data quality checks as data is ingested and transformed in distributed data repositories. In FIG. 8, a presentation layer, a processing layer, and a data layer may be operable to facilitate the identification of sensitive information consistent with present disclosures.

As illustrated in FIG. 8, a user may interact with the sensitive information identifier via a configuration graphical user interface (GUI) that is presented via the presentation layer. The processing layer may retrieve user provided configurations via an application programming interface (API) from the presentation layer. Then, the processing layer may read the configuration, scan the data in the data layer, and write the results into a repository. The data layer may correspond to data in a variety for data storage formats consistent with present disclosure. Finally, the results may be used to generate analytics for the user. The analytics may be graphically represented on a dashboard for the user by the presentation layer.

Accordingly, with this technology, an optimized process for providing an integrated data quality capability that enables data reconciliation and data quality checks as data is ingested and transformed in distributed data repositories is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an integrated data quality capability for distributed data repositories, the method being implemented by at least one processor, the method comprising:

identifying, by the at least one processor from a data stream, an indication that at least one job corresponding to a source data set has been started, the at least one job relating to at least one from among a data ingestion job and a data transformation job;

triggering, by the at least one processor, at least one data reconciliation action based on the identified indication, wherein the at least one data reconciliation action is triggered according to a variable threshold; and
wherein the variable threshold includes an available processing bandwidth of a host system;
persisting, by the at least one processor in a repository, a first result of the at least one data reconciliation action, wherein the first result includes information that relates to a system metric, the at least one data reconciliation action, the source data set, and a target data set;
initiating, by the at least one processor, at least one data quality action on the source data set that has been processed by the at least one data reconciliation action based on the first result, wherein the at least one data quality action determines at least one shortcoming related to inaccuracy or security, and wherein the at least one data quality action is initiated only after the at least one data reconciliation action is determined to have succeeded and not before;
persisting, by the at least one processor in the repository, a second result of the at least one data quality action, the second result including information that relates to at least one from among profile metadata and exception data;
initiating, by the at least one processor, at least one scan action based on the second result, the at least one scan action identifying personally identifiable information in the data stream;
persisting, by the at least one processor in the repository, a third result of the at least one scan action; and
generating, by the at least one processor, at least one graphical element and at least one report based on an analysis of the first result, the second result, and the third result, the at least one graphical element is displayable via a graphical user interface.

2. The method of claim 1, wherein the triggering includes an automated action that relates to at least one from among an ad hoc triggering of the at least one data reconciliation action as the at least one job is performed and a scheduled triggering of the at least one data reconciliation action as the at least one job is performed.

3. The method of claim 1, wherein triggering the at least one data reconciliation action further comprises:
invoking, by the at least one processor, at least one profile object that is associated with the source data set, the profile object corresponding to a plurality of configuration files; and
reconciling, by the at least one processor according to the at least one profile object, the at least one job based on a comparison of the source data set with the corresponding target data set.

4. The method of claim 3, further comprising:
detecting, by the at least one processor, at least one error based on an outcome of the reconciling;
identifying, by the at least one processor using a model, at least one potential issue based on the outcome of the reconciling;
determining, by the at least one processor using the model, at least one recommended action to correct the detected at least one error and the identified at least one potential issue; and
displaying, by the at least one processor via the graphical user interface, the determined at least one recommended action on the at least one graphical element.

5. The method of claim 3, wherein the at least one profile object corresponds to at least one from among a control profile and a risk profile, the at least one profile object defining a reconciliation type and a reconciliation configuration.

6. The method of claim 3, wherein the reconciling is performed at a plurality of data levels, the plurality of data levels including at least one from among a data category level, an entity level, a record level, an attribute level, and a metrics level with variance details.

7. The method of claim 3, wherein reconciling the at least one job further comprises:
identifying, by the at least one processor based on the at least one profile object, at least one record in the source data set to bypass; and
automatically skipping, by the at least one processor, the reconciling for the identified at least one record.

8. The method of claim 1, wherein initiating the at least one data quality action further comprises:
initiating, by the at least one processor, at least one data quality tool for the source data set and the corresponding target data set; and
generating, by the at least one processor, at least one data quality report based on an output of the at least one data quality tool.

9. The method of claim 1, wherein the at least one graphical element relates to a visual representation of an outcome of the analysis, the at least one graphical element corresponding to a dashboard that includes at least one from among a heat map component, a summary component, a record counts component, a details component, an aging component, and an attribute list component.

10. A computing device configured to implement an execution of a method for providing an integrated data quality capability for distributed data repositories, the computing device comprising:
a processor;
a memory; and
a communication interface coupled to each of the processor and the memory,
wherein the processor is configured to:
identify, from a data stream, an indication that at least one job corresponding to a source data set has been started, the at least one job relating to at least one from among a data ingestion job and a data transformation job;
trigger at least one data reconciliation action based on the identified indication,
wherein the at least one data reconciliation action is triggered according to a variable threshold; and
wherein the variable threshold includes an available processing bandwidth of a host system;
persist, in a repository, a first result of the at least one data reconciliation action,
wherein the first result includes information that relates to a system metric, the at least one data reconciliation action, the source data set, and a target data set;
initiate at least one data quality action on the source data set that has been processed by the at least one data reconciliation action based on the first result, wherein the at least one data quality action determines at least one shortcoming related to inaccuracy or security, and wherein the at least one data quality action is initiated only after the at least one data reconciliation action is determined to have succeeded and not before;
persist, in the repository, a second result of the at least one data quality action, the second result including information that relates to at least one from among profile metadata and exception data;

initiate at least one scan action based on the second result, the at least one scan action identifying personally identifiable information in the data stream;

persist, in the repository, a third result of the at least one scan action; and generate at least one graphical element and at least one report based on an analysis of the first result, the second result, and the third result, the at least one graphical element is displayable via a graphical user interface.

11. The computing device of claim 10, wherein the triggering includes an automated action that relates to at least one from among an ad hoc triggering of the at least one data reconciliation action as the at least one job is performed and a scheduled triggering of the at least one data reconciliation action as the at least one job is performed.

12. The computing device of claim 10, wherein, to trigger the at least one data reconciliation action, the processor is further configured to:

invoke at least one profile object that is associated with the source data set, the profile object corresponding to a plurality of configuration files; and reconcile, according to the at least one profile object, the at least one job based on a comparison of the source data set with the corresponding target data set.

13. The computing device of claim 12, wherein the processor is further configured to:

detect at least one error based on an outcome of the reconciling;

identify, by using a model, at least one potential issue based on the outcome of the reconciling;

determine, by using the model, at least one recommended action to correct the detected at least one error and the identified at least one potential issue; and display, via the graphical user interface, the determined at least one recommended action on the at least one graphical element.

14. The computing device of claim 12, wherein the at least one profile object corresponds to at least one from among a control profile and a risk profile, the at least one profile object defining a reconciliation type and a reconciliation configuration.

15. The computing device of claim 12, wherein the processor is further configured to perform the reconciling at a plurality of data levels, the plurality of data levels including at least one from among a data category level, an entity level, a record level, an attribute level, and a metrics level with variance details.

16. The computing device of claim 12, wherein, to reconcile the at least one job, the processor is further configured to:

identify, based on the at least one profile object, at least one record in the source data set to bypass; and automatically skip the reconciling for the identified at least one record.

17. The computing device of claim 10, wherein, to initiate the at least one data quality action, the processor is further configured to:

initiate at least one data quality tool for the source data set and the corresponding target data set; and generate at least one data quality report based on an output of the at least one data quality tool.

18. The computing device of claim 10, wherein the at least one graphical element relates to a visual representation of an outcome of the analysis, the at least one graphical element corresponding to a dashboard that includes at least one from among a heat map component, a summary component, a record counts component, a details component, an aging component, and an attribute list component.

19. A non-transitory computer readable storage medium storing instructions for providing an integrated data quality capability for distributed data repositories, the storage medium comprising executable code which, when executed by a processor, causes the processor to:

identify, from a data stream, an indication that at least one job corresponding to a source data set has been started, the at least one job relating to at least one from among a data ingestion job and a data transformation job;

trigger at least one data reconciliation action based on the identified indication, wherein the at least one data reconciliation action is triggered according to a variable threshold; and wherein the variable threshold includes an available processing bandwidth of a host system;

persist, in a repository, a first result of the at least one data reconciliation action, wherein the first result includes information that relates to a system metric, the at least one data reconciliation action, the source data set, and a target data set;

initiate at least one data quality action on the source data set that has been processed by the at least one data reconciliation action based on the first result, wherein the at least one data quality action determines at least one shortcoming related to inaccuracy or security, and wherein the at least one data quality action is initiated only after the at least one data reconciliation action is determined to have succeeded and not before;

persist, in the repository, a second result of the at least one data quality action, the second result including information that relates to at least one from among profile metadata and exception data;

initiate at least one scan action based on the second result, the at least one scan action identifying personally identifiable information in the data stream;

persist, in the repository, a third result of the at least one scan action; and generate at least one graphical element and at least one report based on an analysis of the first result, the second result, and the third result, the at least one graphical element is displayable via a graphical user interface.

20. The storage medium of claim 19, wherein the triggering includes an automated action that relates to at least one from among an ad hoc triggering of the at least one data reconciliation action as the at least one job is performed and a scheduled triggering of the at least one data reconciliation action as the at least one job is performed.

* * * * *